Dec. 27, 1938.  G. H. HUFFERD ET AL  2,141,753
JOINT STUD AND PROCESS OF MAKING SAME
Filed March 20, 1936    2 Sheets-Sheet 1
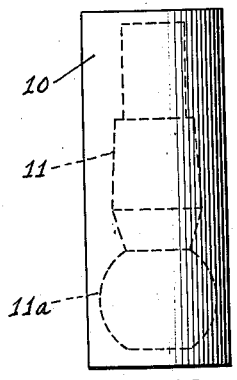
FIG. 1.
OLD METHOD
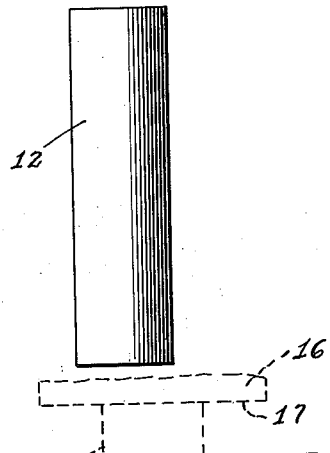
FIG. 2.   FIG. 3.
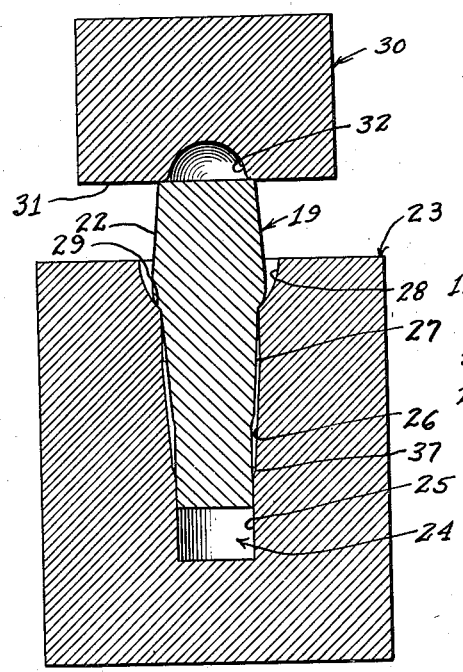
FIG. 4.
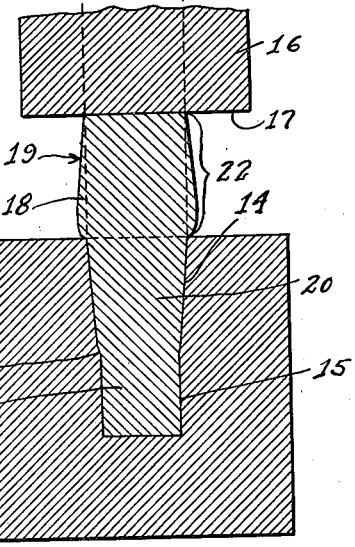
Inventors
George H. Hufferd.
Matthew P. Graham.
by Charles H. Wills Attys.

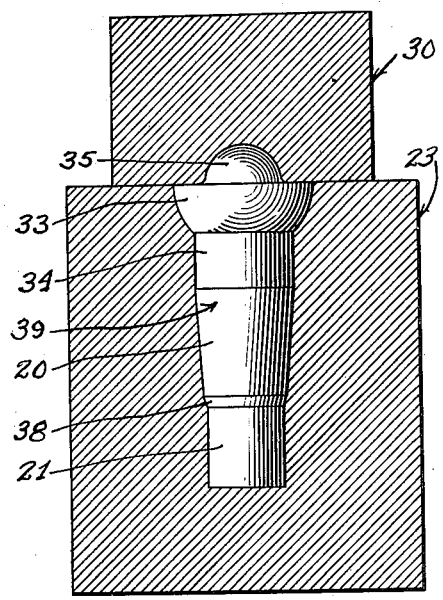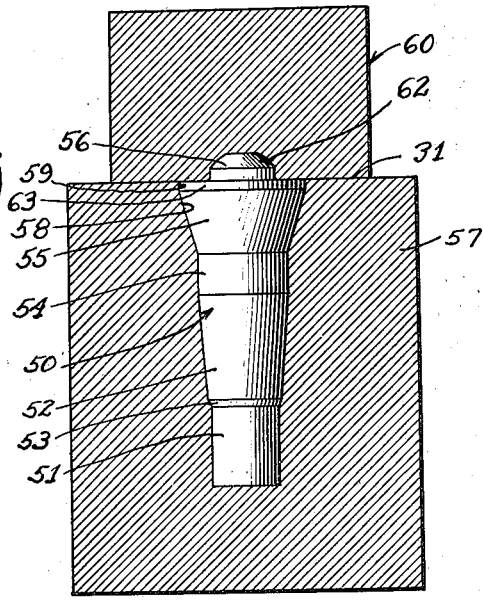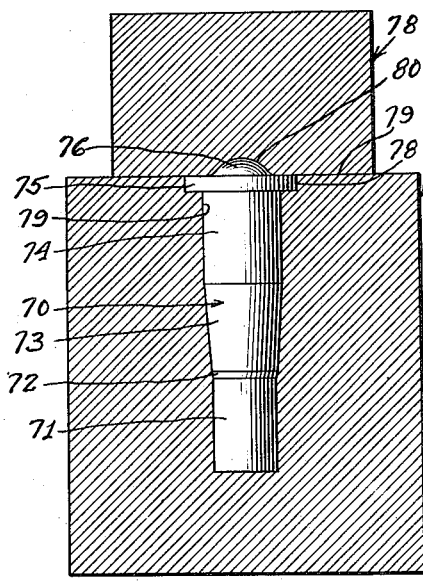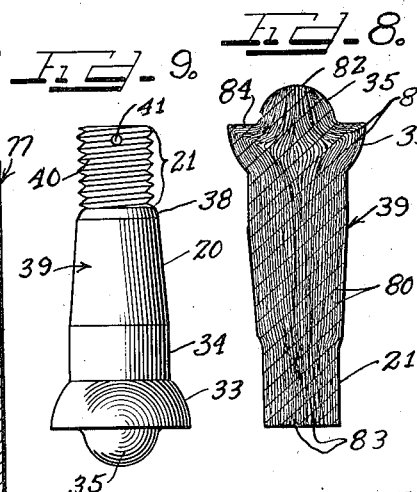

Patented Dec. 27, 1938

2,141,753

UNITED STATES PATENT OFFICE 2,141,753

JOINT STUD AND PROCESS OF MAKING SAME

George H. Hufferd and Matthew P. Graham, Detroit, Mich., assignors to Thompson Products Incorporated, Cleveland, Ohio, a corporation of Ohio Application March 20, 1936, Serial No. 69,856

13 Claims. (Cl. 29—152)

This invention relates to a process of making joint studs from a minimum amount of stock by extrusion and upsetting operations, and includes the joint stud structure made by the process.

More specifically, this invention relates to a process of preparing studs for tie rod joints from cylindrical rods by upsetting and extrusion die forming operations to produce a novel stud having the bearing surface thereof defined by the sides of bowed grain bands.

It has heretofore been considered necessary to prepare joint studs for tie rod joints and the like by lathe operations wherein cylindrical rod stock is turned down to form the joint stud. This process, however, is expensive and involves wastage of considerable amounts of metal. Furthermore, the studs produced by machining operations have the metal grain structure thereof in the identical form and arrangement in which it occurred in the original stock from which the stud was prepared.

We have now devised a process for extruding and upsetting cylindrical rods in dies to produce improved joint studs having the grain bands thereof arranged to provide maximum wear and greater strength. The process is capable of producing the studs from smaller amounts of stock by die pressing operations, is capable of high speed production, and the studs of this invention, besides being of a quality superior to the heretofore prepared machined studs, can also be prepared at lower cost.

It is then an object of this invention to provide a process of working metal stock into joint studs while utilizing all of the material of the stock in the stud.

A further object of this invention is to provide a die pressing process for producing joint studs.

Another object of this invention is to produce joint studs by extruding and upsetting operations.

A further object of this invention is to provide joint studs of increased strength.

Another object of this invention is to provide joint studs of improved metal grain structure capable of withstanding harder usage and wear than the heretofore machine-prepared studs.

Other and further objects of this invention will become apparent to those skilled in the art from the following detailed description of the annexed sheets of drawings, which disclose steps in the process of making joint studs according to this invention, and illustrate the grain structure of the studs of this invention.

On the drawings:

Figure 1 is an elevational view of a cylindrical rod from which the machine-turned studs are prepared, showing in dotted lines the ball-ended stud adapted to be machined therefrom according to prior used lathe turning operations.

Figure 2 is an elevational view of a cylindrical rod from which the studs of this invention can be prepared.

Figure 3 is a vertical cross-sectional view taken through the central portion of a die used in the first step of the process of this invention, and illustrating the manner in which the cylindrical rod shown in Figure 2 is extruded in the die.

Figure 4 is a vertical cross-sectional view taken through another die showing the second step in the process of this invention for upsetting a headed end onto the stud.

Figure 5 is a vertical cross-sectional view of the die shown in Figure 4 and showing the stud therein in elevation after the heading operation.

Figure 6 is a vertical cross-sectional view of another form of die for forming a stud with a frusto-conical bearing portion shown in elevation.

Figure 7 is a vertical cross-sectional view of upsetting dies illustrating another form of stud according to this invention shown in elevation.

Figure 8 is a vertical cross-sectional view taken through the center of the joint stud shown in Figure 5 and illustrating the grain band formation of the metal.

Figure 9 is an elevational view of a finished stud according to this invention.

As shown on the drawings:

In Figure 1, the reference numeral 10 indicates a solid cylindrical rod adapted to be placed in a lathe and turned down to form the stud 11 having a ball end 11a shown in dotted lines. It is evident that a large amount of the metal in the rod 10 is wasted to form the finished article 11.

In Figure 2, the reference numeral 12 indicates a cylindrical solid rod from which the studs of this invention can be prepared without loss of any metal. The difference in size of the rods 10 and 12 is apparent, and it is obvious that the studs of this invention are prepared from less metal stock than is required to prepare the lathe turned studs.

As shown in dotted lines in Figure 3, the rod 12 is placed over a die 13 having a tapered well 14 therein with a smaller cylindrical bottom 15. The top part of the tapered well 14 is just large enough to receive the end of the rod 12. A top die 16 having a flat bottom 17 is then pressed down on top of the rod 12 to force the rod into the die 13, thereby flowing metal from the bottom portion of the rod upwardly as indicated at 18. The downward stroke of the top die 16 terminates in spaced relation above the die 13 when the end of the rod 12 has reached the bottom of the well 14. In this manner, a stud blank 19 is formed having a tapered intermediate portion 20, a cylindrical end portion 21 of smaller size than the original rod, and an enlarged portion 22 above the die 13.

In the first die pressing operation, the metal of the rod has been extruded upwardly from the die 13 to produce the blank 19.

The blank 19 is then removed from the die 13 and inserted in another bottom die 23 having a well 24 therein with a cylindrical bottom portion 25 of the same size as the cylindrical portion 15 of the die 13, an intermediate tapered portion 26 of about the same size as the tapered portion 14 of the stud 13, a cylindrical intermediate portion 27 above the tapered portion 26, and a hemispherical portion 28 at the top thereof. The stud blank 19 fits into the die 23 as shown in Figure 4, with the bottom of the enlarged portion 22 resting on the bottom of the spherical portion 28 of the die, as indicated at 29.

A top die 30 having a flat bottom 31 with a segmental spherical recess 32 in the center thereof is forced downwardly on the blank 19 to move the same into the die 23, and thereby upset the metal of the enlarged portion 22 of the blank 19 into a segmental spherical head 33, as shown in Figure 5, and a cylindrical intermediate part 34 below the head 33. The segmental spherical recess 32 in the die 30 permits some of the metal of the head of the enlarged portion 22 of the blank 19 to flow therein to form a rounded end 35 on the stud.

The dies 13 and 23 may be provided with beveled portions 36 and 37, respectively, between the cylindrical portions and tapered portions of their wells, so as to provide a bevel 38 (Figure 5) on the stud between the cylindrical portion 21 thereof and the tapered portion 20. The stud 39 thus produced comprises a rounded bottom 35, a segmental spherical bearing portion or head 33, a cylindrical portion 34 above the head, a tapered portion 20 above the cylindrical portion 34, a cylindrical top portion 21, and a bevel 38 between the taper 20 and the cylindrical top 21.

As shown in Figure 9, the finished stud 39 has the cylindrical top portion 21 thereof threaded with threads 40 and drilled as at 41 to provide a hole for receiving a cotter pin. The head 33, the cylindrical portion 34, and the tapered portion 20 can then be polished to provide bright bearing surfaces thereon, and if desired, the rounded end 35 can be machined to remove any irregularities from its surface.

In Figure 6, there is shown a modified form of joint stud 50, prepared according to this invention from a cylindrical rod such as 12. The stud 50 has a cylindrical top portion 51, a tapered intermediate portion 52, a bevel 53 between the portions 51 and 52, another cylindrical portion 54 adjacent the large end of the tapered portion 52, a frusto-conical head portion 55 and a rounded end portion 56 of materially smaller diameter than the head portion 55.

The stud 50 is formed in the first die pressing operation identically with the operation described in Figure 3 to produce a blank 19. The so formed blank, however, instead of being placed in a die such as 23, is mounted in a die 57 and forced therein as described in Figures 4 and 5. The die 57, instead of having the segmental spherical portion 28, has a frusto-conical portion 58 with a cylindrical top portion 59. The top die 60, similar to the die 30, has a flat bottom 61 for engaging the top of the blank, but is provided with a recess 62 somewhat flatter than the recess 32 of the top die 30. The stud 50 is thus formed with a frusto-conical head portion 55 having a cylindrical rim 63 at the large end thereof, and a button or lug end portion 56 of smaller diameter than the head 55. The end portion 56 can then be machined into the desired contour to provide a rounded end, or can merely be rounded at the corners thereof.

In the modification shown in Figure 7, a stud 70 is produced with a cylindrical end portion 71, a beveled portion 72, an intermediate tapered portion 73, a second cylindrical portion 74 of larger diameter than the cylindrical portion 71, an annular head or collar 75 and a rounded end 76 somewhat flatter than the rounded end 35 of the stud 39.

The stud 70 is formed from a blank such as 19 in the identical manner described in connection with Figure 3. This blank 19, instead of being upset as described in Figures 4, 5 and 6, is placed in a die 77 having a shallow cylindrical recess 78 in the top thereof and a deeper cylindrical portion 79 of smaller diameter than the portion 78 to thereby form the cylindrical portion 74 and the collar portion 75 of the stud 70. The top die 78 has the flat bottom 79 thereon for acting against the end of the blank member, and a shallow concave recess 80 in the central portion thereof to form the convex end 76 of the stud 70.

From the above description, it will be evident that the studs formed according to this process are made directly from stock, without loss of metal, in two die pressing operations. In the first die pressing operation, the stock is extruded to form a blank with a cylindrical end of smaller diameter than the original stock, an intermediate portion with the larger end of substantially the diameter of the original stock, and an enlarged head portion having a diameter greater than the original stock.

The blank thus formed is then headed to provide any one of a number of shaped laterally extending heads thereon by a die upsetting operation.

The metal stock can be worked in the dies in either a cold or heated condition. If it is desired to heat the stock, the temperatures usually found satisfactory in die forging operations are operative. For example, in the hot die pressing of chrome nickel steel stock, temperatures around 1600° F. are satisfactory.

The vertical cross-sectional view of the stud 39 shown in Figure 8 indicates the grain band formation of the studs of this invention. As shown in this figure, the grain bands 80 extend substantially parallel with the long axis of the stud 39, except at the headed portion 33, of the stud, where they are bowed outwardly, as at 81. The grain bands 80 therefore define the outer surfaces of the studs along their sides. The only portions of the studs defined by the ends of the grain bands are the very top of the rounded portion 35 as at 82, and the end of the cylindrical portion 21 as at 83. Even the bottom 84 of the head 33 is defined by the sides of the grain bands 80. This structure is highly desirable in imparting strength and wearing properties to the joint stud.

Obviously, when the studs are machined from a cylindrical rod, as shown in Figure 1, a large portion of the head 11ᵃ thereof is defined by the ends of the grain bands.

Considering the grain bands to be bundles of fibers or bristles, it is obvious that bearing surfaces defined by the ends of the fibers or bristles will have to be highly machined and polished to provide smooth surfaces. Furthermore, since the grain structure of the studs formed by machining operations necessarily follows the axis of the stud, those grain bands defining the headed portion of the stud are not tied in with the main body portion of the stud and can be broken off more readily than when these bands are bowed outwardly from the body portion to define the head portion, as shown in Figure 8.

The studs of this invention therefore have metallurgical properties providing stronger and better wearing bearing surfaces than the heretofore prepared lathe turned studs.

We are aware that many changes may be made and numerous details of construction may be varied through a wide range without departing from the principles of this invention, and we, therefore, do not purpose limiting the patent granted hereon otherwise than necessitated by the prior art.

We claim as our invention:

1. A joint stud comprising an elongated metal member having a threaded top portion, a tapered portion therebelow, a cylindrical portion adjacent the tapered portion, an enlarged head below the cylindrical portion and a button below the head of smaller diameter than the head, substantially all of the metal grain bands of said member extending from one end of the member to the other to define the tapered portion, the cylindrical portion and the head portion thereof with their sides only.

2. A joint stud comprising an elongated metal member having a threaded top portion, a tapered portion therebelow, a cylindrical portion adjacent the tapered portion, an enlarged segmental spherical head below the cylindrical portion and a button below the head of smaller diameter than the head, said head portion being upset to bow out the metal grain bands of the member with respect to the axis of the member.

3. A joint stud comprising an elongated cylindrical metal member having a threaded top portion, a tapered portion therebelow, a cylindrical portion adjacent the tapered portion, an enlarged upset head below the cylindrical portion and a button below the head portion of smaller diameter than the head, the metal defining the upset head being upset from the metal contained in the long axis of the member and having the grain bands thereof bowed outwardly with respect to the axis of the member.

4. A joint stud comprising an elongated metal member having a threaded top portion, a tapered portion therebelow, a cylindrical portion adjacent the tapered portion, an enlarged frusto-conical head portion below the cylindrical portion, and a button below the head of smaller diameter than the head, the metal defining the frusto-conical head being upset from the metal contained in the long axis of the member.

5. A joint stud comprising an elongated metal member having a threaded top portion, a tapered portion therebelow, a cylindrical portion adjacent the tapered portion, an outturned annular collar below the cylindrical portion, and a rounded end below said collar of smaller diameter than the collar, the metal defining the collar portion being upset from the metal contained in the long axis of the member.

6. The process of making joint studs which comprises extruding a rod to form a tapered portion and an enlarged portion, and upsetting said enlarged portion to form a head on said rod with the metal grain bands defining the head bowed outwardly from the axis of the rod to provide a bearing surface on the head defined by the sides of the grain bands only.

7. The process of making joint studs which comprises die pressing a cylindrical rod to reduce the size of one end thereof and increase the size of the other end, upsetting the enlarged end in a die to produce a head of the desired contour thereon, and die pressing a button on the head during the upsetting operation.

8. The process of making joint studs which comprises working the metal of a rod in a series of die pressing operations to produce a stud having a tapered portion, a cylindrical portion, an enlarged head of the desired contour, and a rounded end of smaller diameter than the head, without loss of any metal of the original rod.

9. The process of making joint studs which comprises extruding one end of a cylindrical rod by die pressure to form a cylindrical end on the rod of smaller diameter than the original rod, a tapered intermediate portion, and an enlarged end portion, and upsetting said enlarged end portion in a die to form a head therefrom of the desired contour.

10. In a stud for tie rod joints and like universal joints, an elongated metal member having an enlarged bearing head, the bearing head being defined by outwardly flared grain bands following the contour of the enlarged head, and the bearing surface of the head being defined by the sides only of the grain bands.

11. A stud for tie rod joints and like universal joints comprising an elongated metal member having a threaded end portion, a tapered intermediate portion, and an enlarged head portion, said member having substantially all of the grain bands thereof extending from one end of the member to the other for defining the tapered portion and the head portion with their sides only.

12. A joint stud blank for tie rod joints and like universal joints comprising a metal member having a cylindrical end portion, an intermediate tapered portion diverging from the cylindrical portion, and an enlarged head portion, said metal member having substantially all of the metal grain bands thereof extending from one end of the member to the other for defining the cylindrical portion, the tapered portion, and the head portion with their sides only.

13. In the process of making joint studs for tie rod joints and like universal joints, the steps which comprise working a metal rod in a series of die-pressing operations to produce a stud having a cylindrical end, a generally tapered portion continuing from said end, and an enlarged head of the desired contour without loss of any metal from the original rod.

GEORGE H. HUFFERD.
MATTHEW P. GRAHAM.